(12) United States Patent
Deeken

(10) Patent No.: US 7,773,337 B2
(45) Date of Patent: Aug. 10, 2010

(54) TAMPER EVIDENT TAPE WITH INTEGRATED EMI SHIELDING

(75) Inventor: John S. Deeken, Toledo, OH (US)

(73) Assignee: Seagate Technology LLC, Scotts Valley, CA (US)

( * ) Notice: Subject to any disclaimer, the term of this patent is extended or adjusted under 35 U.S.C. 154(b) by 684 days.

(21) Appl. No.: 11/673,567

(22) Filed: Feb. 10, 2007

(65) Prior Publication Data

US 2007/0201162 A1 Aug. 30, 2007

Related U.S. Application Data

(60) Provisional application No. 60/772,333, filed on Feb. 10, 2006.

(51) Int. Cl.
*G11B 33/14* (2006.01)
(52) U.S. Cl. .................................... 360/97.02
(58) Field of Classification Search ............ None
See application file for complete search history.

(56) References Cited

U.S. PATENT DOCUMENTS

| 5,169,703 | A | * | 12/1992 | Miyazaki et al. ............ 428/141 |
| 5,319,475 | A | | 6/1994 | Kay et al. |
| 5,494,730 | A | * | 2/1996 | Calhoun et al. ............. 428/164 |
| 6,196,383 | B1 | | 3/2001 | Pinchen et al. |
| 6,881,476 | B2 | | 4/2005 | Noehte et al. |
| 6,903,850 | B2 | | 6/2005 | Kay et al. |
| 2003/0129389 | A1 | * | 7/2003 | Ichikawa et al. ............. 428/343 |
| 2006/0024531 | A1 | * | 2/2006 | Murakami ................. 428/827 |
| 2006/0124585 | A1 | * | 6/2006 | Suwa et al. .................... 216/22 |
| 2008/0057252 | A1 | * | 3/2008 | Danner et al. .............. 428/41.8 |

FOREIGN PATENT DOCUMENTS

| EP | 303384 A2 | * | 2/1989 |
| JP | 11007036 A | * | 1/1999 |

OTHER PUBLICATIONS

3M Electrical, Electronic and EMI Shielding Tapes Selection Guide, 3M Electrical Markets Division, Austin, TX (2006).

* cited by examiner

*Primary Examiner*—Allen T Cao
(74) *Attorney, Agent, or Firm*—Shumaker & Sieffert, P.A.

(57) ABSTRACT

The present invention provides a multilayer tape for simultaneously providing shielding of electromagnetic interference (EMI) and evidence of tampering with an electronic device to which it is applied. The multilayer tape can be attached to an electronic device to cover a seam or other opening in the electronic device. An embossed surface provides evidence of the disruption of the tape, and the tape includes a conductive adhesive to provide EMI shielding. The multilayer tape is particularly useful for sealing the seams of a disk drive device.

15 Claims, 3 Drawing Sheets

TAMPER EVIDENT TAPE WITH INTEGRATED EMI SHIELDING

CROSS-REFERENCE TO RELATED APPLICATIONS

This application claims priority from U.S. Provisional Patent Application Ser. No. 60/772,333, filed on Feb. 10, 2006, the disclosure of which is incorporated herein by reference in its entirety.

FIELD OF THE INVENTION

The present invention relates to the field of electronic devices and in particular relates to an adhesive tape that combines the functionality of electromagnetic interference (EMI) shielding with tamper detection. The tape is particularly useful to provide tamper detection and EMI shielding for electronic components such as disk drives for the storage of data.

BACKGROUND

Security devices in the form of a multilayer tape that is adhered to the seam of an enclosure, such as a DVD case or an enclosure for electronic components, have been used where the tape includes a hologram or diffraction grating. When attempts to open the enclosure occur, the structure of the tape is disrupted and the image or pattern on the tape shows evidence of the attempt.

EMI shielding devices such as EMI shielding tapes are also known. EMI shielding tapes can be used to prevent electromagnetic interference between different components of an electronic device. Increasing device frequencies create decreasing electromagnetic wavelengths that can penetrate very small cracks or openings that may exist in an enclosure surrounding the electronic components. Device failures caused by EMI are increasing as the electronic components become more sensitive. Such tapes can be applied to seams, slots or gaps on the device to reduce EMI by creating a Faraday Cage around the electric components.

Recently, magnetic disk drives for the storage of data have been significantly reduced in size and have found use in myriad devices such as cellular telephones and personal digital assistance (PDAs). In such devices, the electromagnetic interference caused by operation of the disk drive can significantly affect the performance of the device. At the same time, disk drive manufacturers also desire to inhibit users from tampering with the device and then making false warranty claims.

SUMMARY OF THE INVENTION

According to one embodiment of the present invention, a multilayer tape that is adapted to provide evidence of tampering and also provide electromagnetic shielding is provided. The tape includes a substrate having first and second opposed surfaces where the first surface is an embossed surface. An electrically conductive material layer is disposed over the embossed surface and an electrically conductive adhesive layer is disposed on the conductive layer. The tape can advantageously be applied to an electronic device such as a disk drive by adhering the adhesive layer to the surface of the device. By virtue of the electrically conductive adhesive layer and the electrically conductive material layer, the tape advantageously provides EMI shielding when the tape is applied over a gap or seam in the device enclosure. In addition, the embossed surface can provide evidence of tampering with the electronic device when someone attempts to open the enclosure.

According to another embodiment, a disk drive device is provided that includes a base plate, a cover connected to the base plate to define an enclosure for housing disk drive components, and a multilayer tape that covers at least a portion of a seam between the base plate and the cover. The multilayer tape includes a security layer adapted to indicate if the base plate and cover have been disconnected, a conductive metallic layer disposed between the security layer and the seam and an electrically conductive adhesive disposed between the conductive metallic layer and the seam. The seam can be disposed around the perimeter of the disk drive device and the multilayer tape preferably covers substantially the entire seam, providing a continuous electrical connection between the cover and the base plate.

According to another embodiment of the present invention, a method for the manufacture of a multilayer tape structure is provided. The method includes the steps of providing a polymer substrate having first and second opposed surfaces, embossing the first surface to form an embossed surface, depositing a metallic layer onto the embossed surface and depositing a conductive adhesive onto the metallic layer.

DESCRIPTION OF THE INVENTION

Figure 1:
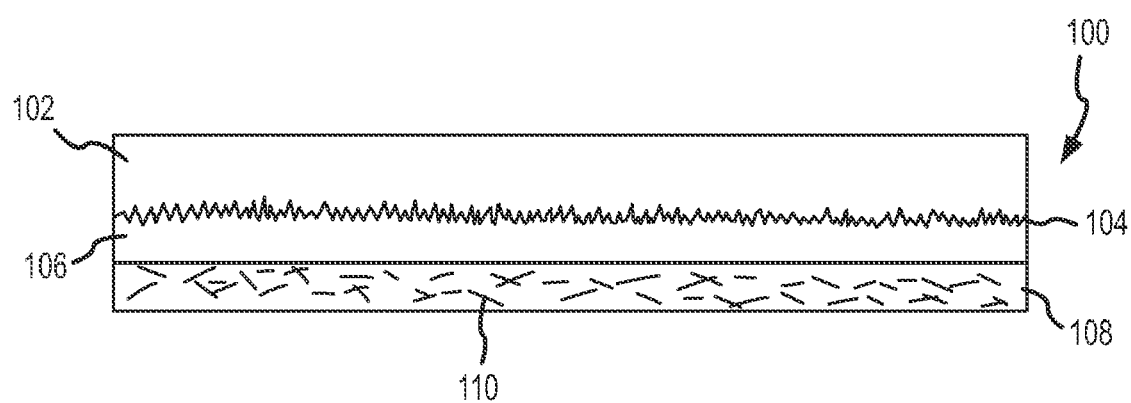
FIG. 1 illustrates a cross-sectional view of a multilayer tape according to an embodiment of the present invention.

A cross-sectional view of a multilayer tape 100 according to the present invention is illustrated in FIG. 1. The tape 100 includes a substrate 102 upon which an embossed surface 104 is formed to create a security layer. An electrically conductive material layer 106 is disposed on the embossed surface 104 and a conductive adhesive layer 108 is disposed on the conductive material layer 106. In use, the tape 100 is adhered to an electronic device by virtue of the adhesive layer 108. When adhered to the seam of an enclosure that surrounds the electronic device, the multilayer tape 100 advantageously provides EMI shielding and also deters unauthorized users from opening the enclosure.

The substrate 102 is preferably an organic polymer, for example, a polyester such as polyethylene terephthalate (PET), polypropylene, polyvinyl chloride, polyethylene naphthalate, polymethylpentene (PMP) or polyimide. The substrate should be sufficiently thin such that the substrate 102 is not opaque, thereby permitting the embossed layer 104 to be viewed when observed through the substrate 102. In one embodiment, the substrate 102 has a thickness of at least about 10 μm and not greater than about 30 μm.

An embossed surface 104 is formed on one of the two opposed surfaces of the substrate 102. An embossed surface 104 is one that includes structural discontinuities sufficient to create an optically variable surface that can be readily observed by a viewer. Thus, when the tape 100 is viewed through the substrate 102, the viewer will see the pattern corresponding to the embossed surface 104. The embossed surface 104 can be formed by etching the substrate 102, such as by a laser or other application of heat.

Deposited on the embossed surface 104 on the opposite side of the substrate 102 is an electrically conductive material layer 106. The electrically conductive material layer 106 can include any electrically conductive and optically reflective material. In one embodiment, the conductive material layer is a metallic layer, such as one that comprises aluminum. The conductive material layer 106 should be sufficiently thick to coat the entire embossed surface 104, but preferably has a thickness that is less than the thickness of the substrate 102. Preferably, the conductive material layer 106 has an average thickness of not greater than about 10 μm and more preferably not greater than about 6 μm. The conductive material layer 106 can be deposited by vapor deposition of a metal.

An electrically conductive adhesive layer 108 is disposed on the conductive material layer 106. The conductive adhesive layer 108 is sufficiently electronically conductive to provide electrical conductance between the electronic device to be fitted with the multilayer tape 100 and the conductive material layer 106, thereby providing EMI shielding to the electronic device. According to one embodiment, the conductive adhesive layer 108 has an electrical resistance of not greater than about $10^{-3}\Omega$. Preferably, the electrical resistance of the conductive adhesive layer is not greater than about $10^{-6}\Omega$ and even more preferably is not greater than about $10^{-9}\Omega$. The adhesive is preferably a pressure-sensitive adhesive so that the tape 100 can be applied to an electronic device using only pressure. The conductive adhesive can include an adhesive matrix and a solid electrically conductive material 110 dispersed within the adhesive matrix. For example, the solid conductive material can be selected from the group consisting of carbon, aluminum and nickel. In one preferred embodiment, the solid conductive material includes fibers, such as nickel fibers. Nickel fibers are believed to be advantageous in this application as the electronic conductance of adhesives containing nickel fibers is less sensitive to application pressure than other materials.

Figure 2:
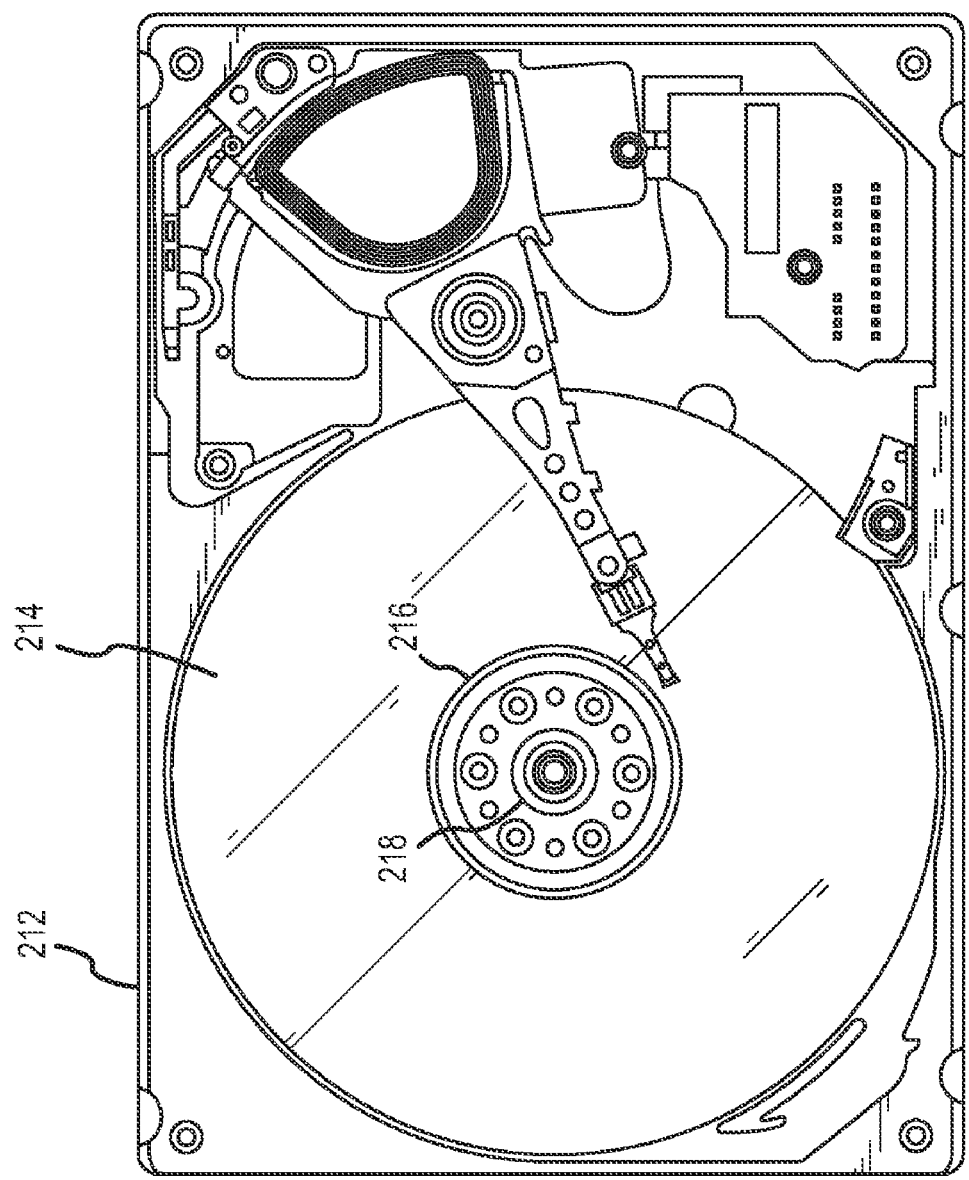
FIG. 2 illustrates a disk drive device.

The tamper evident tape 100 can be applied to an electronic device over the seam that is formed between two portions of the enclosure of the electronic device. By way of example, FIG. 2 illustrates a disk drive 210. The disk drive 210 generally includes a base plate 212 and a cover (not shown) that may be disposed on the base plate 212 to define an enclosed housing or space for the various disk drive components. The disk drive 210 includes one or more data storage disks 214 of any appropriate computer-readable data storage media. Each disk 214 is mounted on a hub or spindle 216, which in turn is rotatably interconnected with the disk drive base plate 212 and/or cover. Multiple data storage disks 214 are typically mounted in vertically spaced and parallel relation on the spindle 216. Rotation of the disk(s) 214 is provided by a spindle motor 218 that is coupled to the spindle 216 to simultaneously spin the data storage disk(s) 214 at an appropriate rate.

Figure 3:
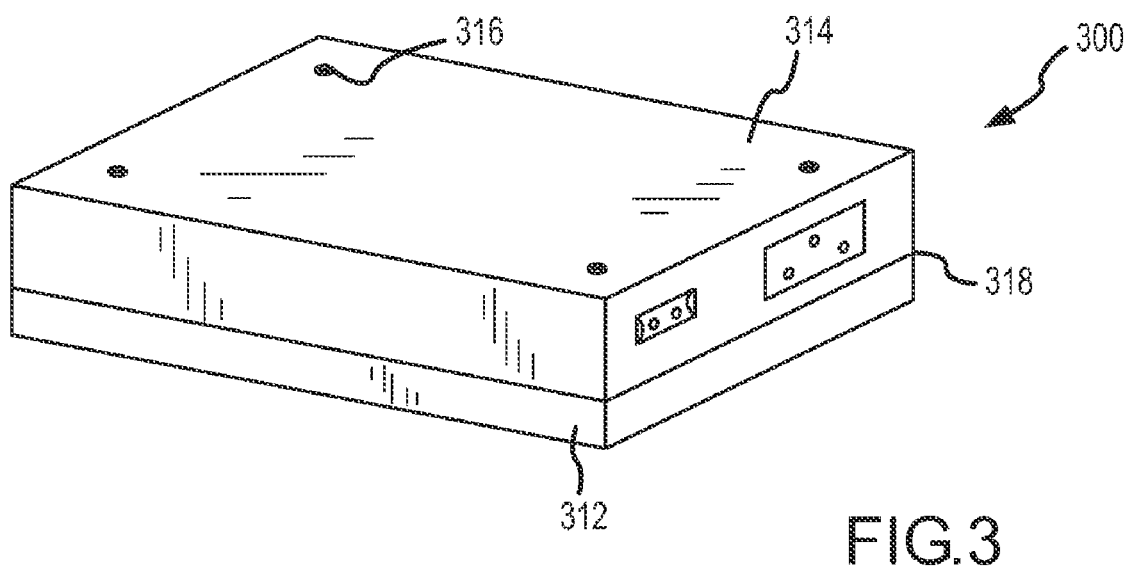
FIG. 3 illustrates a perspective view of an assembled disk drive device.

FIG. 3 illustrates a perspective view of an assembled disk drive assembly 300. The disk drive assembly includes a base plate 312 and a cover 314. The cover 314 is connected to the base plate 312 utilizing threaded fasteners 316 or a similar mechanism to form an enclosure for the disk drive components, as is discussed above. Around the periphery of the disk drive device 300 is a seam 318 that is formed where the cover 314 contacts the base plate 312. Although the seam 318 is reasonably narrow, EMI, such as that produced by operation of the disk drive motor, is capable of leaking through the seam 318. This EMI can interfere with the operation of other electrical components that are disposed in close proximity to the disk drive 300.

Figure 4:
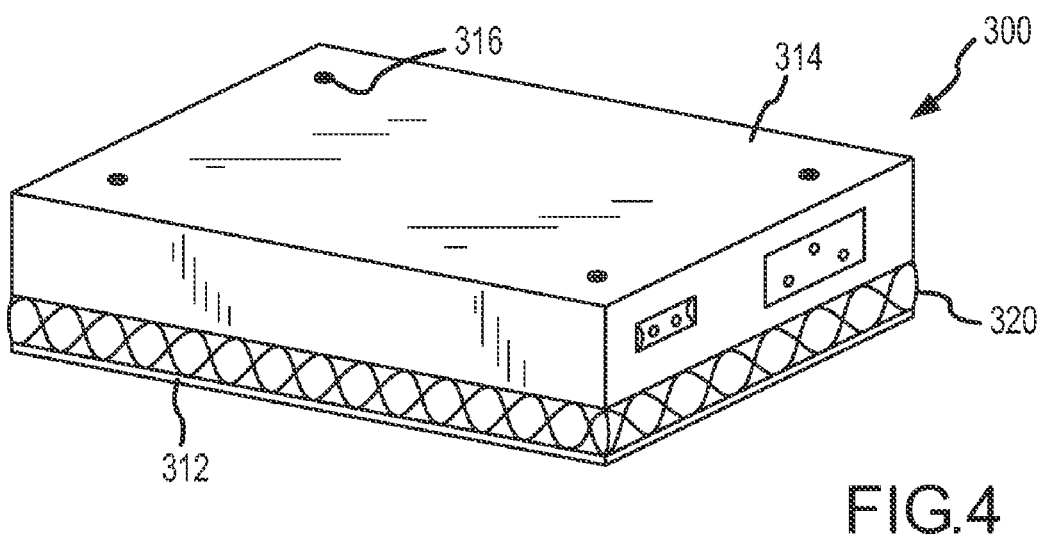
FIG. 4 illustrates a perspective view of an assembled disk drive device including a multilayer tape according to the present invention.

FIG. 4 illustrates a disk drive device 300 that includes a multilayer tape 320 of the present invention disposed around the seam 318 of the disk drive device. When the conductive adhesive is a pressure sensitive adhesive, sufficient pressure should be applied to ensure an electrically conductive pathway is formed between the enclosure surface and the conductive material layer of the multilayer tape 320. The multilayer tape 320 preferably covers the entire seam 318 to prevent EMI from leaking out of the enclosure.

The tape 320 also provides evidence of tampering, i.e., evidence that the cover 314 has been removed from the base plate 312. Three interfaces exist after the multilayer tape is applied to an enclosure, namely the substrate-conductive material interface, the conductive material-adhesive interface, and the adhesive-enclosure interface. The multilayer tape of the present invention is designed so that the adhesive strength of the substrate-conductive material interface is the lowest. To open the device and access the internal components, the tape must first be removed from the seam. When a user attempts to remove the multilayer tape, the substrate is peeled away from the underlying conductive material layer, providing evidence of the tampering. The adhesive and conductive material layers remain intact and advantageously continue to provide EMI shielding.

While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. A multilayer tape that is adapted to provide evidence of tampering and provide electromagnetic shielding, comprising:
    a substrate having first and second opposed surfaces, wherein said first surface is an embossed surface;
    an electrically conductive material layer disposed over said embossed surface; and
    an electrically conductive adhesive layer disposed on said conductive material layer.

2. A multilayer tape as recited in claim 1, wherein said substrate comprises an organic polymer.

3. A multilayer tape as recited in claim 1, wherein said substrate is a polyester substrate.

4. A multilayer tape as recited in claim 1, wherein said substrate has a thickness of at least about 10 μm and not greater than about 30 μm.

5. A multilayer tape as recited in claim 1, wherein said conductive material layer comprises a conductive metal.

6. A multilayer tape as recited in claim 1, wherein said conductive material layer is a substantially uniform metallic layer covering said substrate.

7. A multilayer tape as recited in claim 1, wherein said conductive material layer has an average thickness of not greater than about 10 μm.

8. A multilayer tape as recited in claim 1, wherein said conductive material layer has a thickness that is less than the thickness of said substrate.

9. A multilayer tape as recited in claim 1, wherein said conductive adhesive layer has an electrical resistance of not greater than about $10^{-6}\Omega$.

10. A multilayer tape as recited in claim 1, wherein said conductive adhesive comprises an adhesive matrix and a solid conductive material dispersed within said matrix.

11. A multilayer tape as recited in claim 10, wherein said solid conductive material comprises a material selected from the group consisting of carbon, aluminum and nickel.

12. A multilayer tape as recited in claim 11, wherein said solid conductive material comprises conductive fibers.

13. A method for the manufacture of a multilayer structure, comprising the steps of:

provinding a polymer substrate having first and second opposed surfaces;

embossing said first surface to form an embossed surface;

depositing a metallic layer onto said embossed surface; and depositing a conductive adhesive onto said metallic layer.

14. A method as recited in claim 13, wherein said polymer substrate is a polyester substrate.

15. A method as recited in claim 13, wherein said step of depositing a metallic layer comprises vapor deposition of a metal onto said embossed surface.

* * * * *